United States Patent Office 3,694,251

Patented Sept. 26, 1972

3,694,251

COATED ARTICLE HAVING A LAYER OF BOEHMITE AND ALKYL TITANATE

James F. Houle and Gilden R. Van Norman, Rochester, N.Y., assignors to Eastman Kodak Company, Rochester, N.Y.

No Drawing. Continuation of application Ser. No. 654,697, July 20, 1967, which is a continuation-in-part of application Ser. No. 505,041, Oct. 24, 1965, now Patent No. 3,486,450, which in turn is a continuation-in-part of application Ser. No. 347,931, Feb. 27, 1964, now Patent No. 3,342,601. This application Nov. 14, 1969, Ser. No. 871,607

Int. Cl. B44c *3/02;* B44d *1/14, 1/44*

U.S. Cl. 117—62 6 Claims

ABSTRACT OF THE DISCLOSURE

A support especially useful for a printing plate or color proofing element carries a hydrophilic layer of a reaction product of a basic metal oxide such as fibrous alumina having the boehmite crystal structure, with an alkyl titanate complex.

RELATED APPLICATIONS

This application is a continuation of our U.S. patent application Ser. No. 654,697, now abandoned, which is a continuation-in-part of our U.S. patent application Ser. No. 505,041 filed Oct. 24, 1965, now Pat. No. 3,486,450 which is a continuation-in-part of our U.S. patent application Ser. No. 347,931 filed Feb. 27, 1964, now Pat. No. 3,342,601.

This invention relates to photographic supports, the surfaces of which are hydrophilic. The hydrophilic surfaces are obtained by reaction of a basic metal oxide such as fibrous boehmite, with an alkyl titanate complex. When the supports are metal such as grained aluminum, the element is particularly adapted to the production of lithographic printing plates and when the supports are transparent polymer layers, the elements are especially useful for making color proofs for lithographic printing processes.

The hydrophilic surfaces are formed on the supports by coating (1) an aqueous dispersion of preferably fibrous boehmite onto the support and coating (2) a complex of an alkyl titanate and at least one member of the class consisting of fluosilicic acid, hydrofluoric acid, fluoboric acid, hydrogen peroxide, a mixture of hydrogen peroxide and one or more of said acids or phosphoric acid. As a result, a new complex is formed on the support which is substantially non-fibrous, hydrophilic and has the properties desired either as a surface for use in the preparation of lithographic printing plates or in the preparation of color proofing elements.

In our U.S. patent application Ser. No. 347,931 filed Feb. 27, 1964 we have described the use of the above alkyl titanate complexes per se for coating supports for the production of lithographic printing plates, and in our U.S. patent application Ser. No. 505,041 filed Oct. 24, 1965 we have described the use of these titanate complexes for coating transparent supports for producing color proofing elements.

According to the present invention improved properties are obtained in the layers by reacting the fibrous boehmite with the alkyl titanate complexes rather than using only the titanate complexes as will appear from the following description. In general, the improvement is manifest by substantially better ink-water differentiation being obtained in the printing plates and color proofing elements formed from the hydrophilic surfaces of the invention. For example, when hydrophobic images such as insoluble resin images are formed on the hydrophilic surfaces, greasy printing inks take only on the resin images providing a high definition color proofing element or lithographic printing plate depending upon the process under consideration.

The supports upon which the hydrophilic surfaces are formed include a wide range of materials preferably in sheet form including wood, paper, metal, glass and polymer supports. The hydrophilic layers on metal supports such as grained aluminum are very useful for the preparation of lithographic printing plates. When the support is a transparent polymeric material, the element is especially useful for making the color proofing elements as described in more detail below. The polymeric sheet materials are those well known in the art such as cellulose ester, e.g. cellulose triacetate, linear polyesters such as polyethylene terephthalate, polyamides such as nylon, polyacrylic esters such as polymethyl methacrylate and the like.

"Fibrous boehmite" which is used in our invention is fibrous alumina monohydrate having the boehmite crystal lattice. Fibrous boehmite is distinct from aluminum hydroxide and other aluminas. Fibrous boehmite has fibrils ranging from about 3 to 1,500 millimicrons in length. The width of the fibrils is about one-tenth the length. The fibrous character is readily apparent by examination of the boehmite with the electron microscope at magnifications of the order of 25,000 diameters. Fibrous boehmite is prepared as described in Bugosh U.S. Pat. 2,915,475, for example by heating aluminum oxide, $Al_2O_3$, in strong acid such as hydrochloric acid. However, fibrous boehmite prepared in the presence of weak acid, or containing weak acid such as acetic acid, is useful in our invention. Fibrous boehmite useful in the invention is available commercially under the trade name Baymal and manufactured by E. I. du Pont de Nemours and Co. of Wilmington, Del. This product is advertized in the booklet entitled "Du Pont Baymal Colloidal Alumina" as a white powder containing about 85% AlOOH and 9% acetic acid. Dilute aqueous solutions of the fibrous boehmite can be used in our invention for coating the supports. For example, solutions containing about 0.5 to 5% by weight of fibrous boehmite are useful. The pH of the boehmite solution can vary but is preferably less than 7 to facilitate the coating of the layers. The coating solutions can be obtained by dispersing the dried fibrous boehmite in water by use of well-known surfactants of the nonionic types. Organic solvents can be present but are not necessary.

The aqueous solutions of fibrous boehmite are preferably coated upon the photographic supports such as smooth polymeric supports so as to apply about 2 to 20 grams of fibrous boehmite per 1,000 square feet of coating surface, especially when the light-sensitive material subsequently applied is a diazo resin described below. A preferred range is 7 to 9 grams per 1,000 square feet. This quantity of fibrous boehmite provides layers of a range of thickness which facilitates the subsequent reaction with the alkyl titanate complexes, in situ, on the support to form the desired substantially non-fibrous hydrophilic surface. When boehmite is coated on supports such as grained aluminum which has more effective surface area than smooth polymer supports somewhat more than the indicated amount is used to insure production of a uniform layer for reaction with the titanium complex.

If the fibrous boehmite layer is too thick, in the subsequent reaction with the titanium complexes a hydrophilic layer is obtained which hinders the preparation thereon of differentially ink-receptive images. For example, removal of unexposed diazo resin from the layer may be difficult. Also, a hardened diazo resin image may be buried in a thick layer of the reaction product and not readily take printing ink. Conversely, a thin layer of fibrous boehmite on the support reacts with the titanium complexes to give surfaces which when wetted do not uniformly repel printing inks.

The optimum quantity of fibrous boehmite coated on the support can be expected to vary somewhat from the above range depending in part upon the particular fibrous boehmite and titanate complex as well as the light-sensitive material applied thereto as can be determined by simple experiment. Thus, the range of coating weight and thickness given is optimum when the Baymal variety of boehmite is reacted especially with the titanium peroxyphosphate complex described below and the sensitive layer applied is a diazo resin.

The amount of titanium complex coated to the fibrous boehmite layers is preferably that amount which reacts with all or most of the boehmite to substantially destroy the fibrous structure of the layer. For example, if 7 to 9 gms./1,000 sq. ft. of boehmite are present, about 0.6 gm./1,000 sq. ft. of titanium metal in the form of the complex is coated. Tests have shown that if any substantial amount of unreacted fibrous boehmite remains in the layer, when sensitive layers are coated thereon, such as light-sensitive diazo resin layers, the shelf life of the product is decreased and in photomechanical processes using the product, poor ink-water differentiation is obtained.

The alkyl titanate complexes which are used for reaction with the fibrous boehmite layers are prepared as described in our above inventions, for example by dissolving alkyl titanates, preferably lower alkyl titanates, in water using the above acids such as fluosilicic acid, or a mixture of peroxide and one of the acids, e.g. phosphoric acid as illustrated in the examples below. Preferred alkyl titanates are those having alkyl groups with 2 to 5 carbon atoms such as, for example, tetraethyl titanate, tetrapropyl titanate, tetraisopropyl titanate, tetrabutyl titanate, tetraisobutyl titanate, tetraamyl titanate, etc. The complexes have distinct utility in the elements and processes of the invention compared to colloidal titania prepared, for example, by hydrolysis of titanium halides or alkyl titanates.

An important use of the hydrophilic layers comprising the reaction product of fibrous boehmite and the titanium complexes, illustrated in the examples, is in the preparation of color proofing elements in the manner described in our above application Ser. No. 505,041. A light-sensitive diazo resin, e.g. a formaldehyde-p-diazo diphenylamine condensate, is coated upon the hydrophilic layer on a thin transparent film base. An insoluble diazo resin image is formed on the layer by exposure to a color separation negative of the color printing process under consideration. A two-phase lacquer containing, e.g. the identical red printing ink of the printing system, is then used to color the resin image to obtain the red proof. Blue, yellow and black proofs are made in the same manner using lacquers containing blue, yellow and black inks of the printing system. The proofs are then superposed in register and viewed by reflected light to predict more accurately the color quality of the press proof to be obtained on the printing press using the same negatives for making the printing plates. As mentioned above, it is distinctly advantageous to prepare the proofs upon the hydrophilic layer of the fibrous boehmite-titanate complex reaction product, compared to the use of either a fibrous boehmite layer or a layer of the titanate complex.

The process for preparing the color proofs is much superior to any previously known color proofing method such as that in current use employing elements comprising a transparent support, a light-sensitive resin layer thereon and a colored layer outermost. This system requires a larger number of such differently colored elements for the printer to predict with any certainty the color balance obtainable from the separation negatives used. More particularly, it is necessary to use different exposures with the different separation negatives in that system, whereas in the process of our invention the same exposure can be given for each separation negative. Also, the present invention enables a printer to use only a single light-sensitive element which is later colored with the same inks as the printer uses on the press.

The following examples will serve to illustrate our invention.

EXAMPLE 1.—PREPARATION OF COLOR PROOF

Fibrous boehmite coating

A thin polyester film base subbed with a vinylidene chloride copolymer as in U.S. 3,271,345 is provided and coated with a 1.0% dispersion of fibrous boehmite in water to a coverage of about 7 to 9 gms. of solids/1,000 sq. ft. of coating surface following by drying the coating.

Titanate complex coating 71.6 parts by weight of tetraisopropyl titanate is added to 990 parts by weight of 30% hydrogen peroxide in 4965 parts by weight of water and 101 parts by weight of 85% phosphoric acid then added. The precipitate gradually dissolves with stirring. The resulting solution of titanate complex is then coated upon the above fibrous boehmite coating at a coverage of about 0.6 gm./1,000 sq. ft. of coating surface of titanium metal as the complex to obtain a transparent layer of hydrophilic reaction product on the film base. Examination of the transparent coating under the electron microscope at about 40,000 to 160,000 diameters shows the layer to be substantially free of fibrils or non-fibrous.

A diazo resin prepared by condensation of formaldehyde with p-diazodiphenylamine salt as described in Example 2 of U.S. Ser. No. 505,041 is coated with from 0.5 to 2.5% aqueous solution onto the hydrophilic surface of the film. The pH of the solution can be adjusted by addition of acids such as phosphoric acid.

The resulting light-sensitive element is then exposed to a line and half-tone color separation image of a subject, flushed with water and treated with a desensitizer solution such as one containing a wetting agent, monosodium phosphate, sodium hydroxide, water and a copolymer of methyl vinyl ether and maleic anhydride for removal of the unexposed areas.

The sheet is then treated with a two-phase color proofing lacquer composition containing a thickener in the aqueous phase and in the solvent phase the greasy printing ink of the color corresponding to the separation image used in the original exposure step, in this case the red ink. A useful lacquer is:

| | G. |
|---|---|
| Phenol-formaldehyde resin (Amberol-M82 manufactured by the Rohm and Haas Co.) | 8.0 |
| Nonyl phenyl polyethylene glycol ether | .40 |
| Xylol | 18.0 |
| Toluol | 12.0 |
| 3-heptanone | 10.0 |
| Sodium lauryl sulfate | 1.50 |
| Polysaccharide gum | 0.60 |
| Sodium salt of pentachlorophenol | 0.40 |
| Water | 149.46 |

to which about 4–12 g. of printing ink is added.

Blue, yellow, and black proofs are made in the same manner using the corresponding negatives and superposed in register with red proof to predict the color balance obtainable in the press proof using the same inks. As a result, when the printing plates are prepared from the separation negatives as indicated from the color proof, it is found that the press proof has almost exactly the predicted color balance.

When the same color separation negatives are used with the commercially available color proofing materials mentioned above, only the most skilled plate makers and pressmen are able to predict with any certainty the color balance obtainable in a press proof. In fact, it is necessary to run at least one press proof for confirmation.

The light-sensitive diazo sheets prepared as described above are found to have good stability when stored for extended periods of time. The quality of the sheets is better than for similar sheets where the diazo resin has been coated on a layer of titanate complex or on a layer of the fibrous boehmite. In the latter case it appears that the boehmite reacts with the diazo resin to partially insolubilize it with the result that areas of the printing plates or color proofs which should be hydrophilic tend to take printing ink or no image is obtainable.

When preparing the color proofing elements, it may be desirable to form the hydrophilic layer on both sides of the transparent polymeric support particularly to guard against accidental treatment of the back of the support with the colored lacquer composition which would spoil the color proof.

EXAMPLE 2.—PREPARATION OF PRINTING PLATE

A grained aluminum sheet is coated with fibrous boehmite and then the alkyl titanate complex in the manner described in Example 1. After coating the diazo resin on the resulting hydrophilic layer and exposing to a line or half-tone subject, the unexposed resin is removed with a desensitizer solution leaving the hardened resin image on the hydrophilic surface. The plate is then lacquered using a vinylidene chloride-acrylonitrile copolymer lacquer such as shown in U.S. Pat. 3,276,360. The printing plate obtained is then printed on a lithographic printing press to obtain a multiplicity of prints of high definition.

EXAMPLE 3

The process of Example 1 is carried out except that colloidal silica is first coated upon the polyester support instead of fibrous boehmite, followed by a coating of the titanium complex. To the resulting coating is applied the same diazo resin and a red color proof is formed therein in the same manner. The color proof is useful in combination with similarly prepared proofs of the other colors for prediction of the color quality obtainable in the press proof from plates made from the same separation negatives.

In the manner of the above examples other basic metal oxides, e.g. aluminum, zinc, hafnium, molybdenum, tungsten, chromium, iron and cadmium oxides, particularly in colloidal form, are coated on the supports and subsequently a coating of the titanium complexes is applied thereto to provide a surface for coating with the light-sensitive layers especially diazo resin layers.

In the manner of the above examples other alkyl titanate complexes with fluosilicic, hydrofluoric and fluoboric acids can be coated upon the metal or polymer supported layers of fibrous boehmite. Our above inventions may be referred to for useful methods for preparing these complexes. However, the complexes are readily obtainable by merely adding the titanates to aqueous solutions of the acids and preferably peroxide with stirring and allowing any precipitate first formed to dissolve. The hydrophilic surfaces obtained are adapted to sensitizing and processing according to the processes of Examples 1 and 2 to obtain printing plates or color proofs. It will be understood that the color proofing elements prepared as in Example 1, at the stage where the unexposed diazo resin has been removed, can actually be used as lithographic printing plates since they comprise hydrophobic ink-receptive image areas and hydrophilic ink-repellant areas. However, a fairly thick polymer support should be employed if such usage is contemplated.

Various light-sensitive layers can be coated upon the hydrophilic layers comprising the reaction product of the fibrous boehmite and titanate complexes. Photographic silver halide emulsions can be coated thereon as well as light-sensitive organic compounds such as aliphatic and aromatic esters, hydrazides and amides of naphthoquinone-diazide-sulfonates, cinnamalmalonic acids, their substitution products and functional derivatives, diazonium salts of amino-diphenyl amines and their condensation products with formaldehyde, ortho- and para-quinone diazides of benzals, anthracenes and heterocyclic systems, for example, quinoline, indazoles, benzimidazoles, diphenyloxides, also diazoketones, unsaturated ketones, ortho- and para-iminoquinone diazides, derivatives of alkylnitronaphthalenesulfonates, nitroaldehydes, acenaphthene, stilbene, azides and diazides and high molecular weight diazo resins. Particularly useful light-sensitive diazo resins are disclosed by U.S. Pat. 2,714,066 and in our inventions identified above.

In the two-phase lacquer compositions illustrated in Example 1 containing water-soluble thickener and polymer, the phenol-formaldehyde resin may be replaced by a variety of polymers with some adjustment of the solvent, e.g. terpene polymers, indene and coumarone-indene polymers, rosin esters and the like. The ink content of the lacquer is adjusted so the color proof predicts the color balance of the press proof as accurately as possible.

The invention has been described in considerable detail with particular reference to certain preferred embodiments thereof, but it will be understood that variations and modifications can be effected within the spirit and scope of the invention as described hereinabove, and as defined in the appended claims.

We claim:

1. An article of manufacture with intended use in photography and lithography comprising a support having at least one hydrophilic surface provided by coating said support with an aqueous dispersion of fibrous boehmite in an amount which will apply from about 2 up to about 20 grams of said fibrous boehmite per 1000 square feet of said surface and subsequently overcoating said fibrous boehmite with a sufficient amount of an aqueous solution consisting essentially of a complex of an alkyl titanate and a solubilizing component selected from the class consisting of fluosilicic acid, hydrofluoric acid, fluoroboric acid, hydrogen peroxide and a mixture of hydrogen peroxide and phosphoric acid to react with substantially all of said fibrous boehmite and produce a substantially non-fibrous hydrophilic layer, which is the reaction product of said fibrous boehmite and said aqueous solution on said surface.

2. The article of manufacture according to claim 1 and wherein said aqueous solution is prepared by combining water, hydrogen peroxide, phosphoric acid and alkyl titanate.

3. The article of manufacture according to claim 1 and wherein said support material is a transparent polymeric support material.

4. The article of manufacture of claim 1 and wherein said support material is a transparent polymeric support material, and said aqueous solution is prepared by combining water, hydrogen peroxide, phosphoric acid and alkyl titanate.

5. The article of manufacture of claim 1 wherein said support comprises a transparent synthetic polymeric support and said aqueous dispersion of fibrous boehmite is coated in an amount to provide from about 7 to about 9 grams of fibrous boehmite per 1,000 square feet of coated surface.

6. The article of manufacture of claim 1 wherein said support is a transparent synthetic polymeric support, said aqueous dispersion of fibrous boehmite is coated in an amount to provide from about 7 to about 9 grams of fibrous boehmite per 1,000 square feet of coated surface and said aqueous solution is prepared by combining water, hydrogen peroxide, phosphoric acid and alkyl titanate.

(References on following page)

References Cited

UNITED STATES PATENTS

| | | | |
|---|---|---|---|
| 3,210,184 | 10/1965 | Uhlig | 96—33 X |
| 3,342,601 | 9/1967 | Houle et al. | 96—33 X |
| 3,013,901 | 12/1961 | Bugosh | 117—72 |
| 3,208,849 | 9/1965 | Steinle | 96—33 X |
| 3,181,461 | 5/1965 | Fromson | 96—33 X |
| 2,908,593 | 10/1959 | Naidus | 117—127 X |
| 2,950,174 | 8/1960 | Lagally | 23—202 |
| 3,161,521 | 12/1964 | Cohn et al. | 96—33 X |
| 2,714,066 | 7/1955 | Jewett et al. | 96—33 X |

OTHER REFERENCES

Hartsuch, P. J., "Chem. of Lithography," Lith. Tech. Foundations Inc., 1961, p. 104 relied on.

CHARLES L. BOWERS, Jr., Primary Examiner

U.S. Cl. X.R.

117—69, 71 R, 71 M, 127, 130 R, 138.8 R, 138.8 F, 169; 23—202 R; 96—33, 75, 86 R, 87 R; 148—6.27